US011465599B2

(12) United States Patent
Ito et al.

(10) Patent No.: US 11,465,599 B2
(45) Date of Patent: Oct. 11, 2022

(54) BRAKE SYSTEM AND CONTROL METHOD OF BRAKE SYSTEM

(71) Applicant: HITACHI AUTOMOTIVE SYSTEMS, LTD., Hitachinaka (JP)

(72) Inventors: Takahiro Ito, Tokyo (JP); Kenichiro Matsubara, Hitachinaka (JP); Wataru Yokoyama, Hitachinaka (JP); Daisuke Goto, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 329 days.

(21) Appl. No.: 16/763,806

(22) PCT Filed: Oct. 5, 2018

(86) PCT No.: PCT/JP2018/037403
§ 371 (c)(1),
(2) Date: May 13, 2020

(87) PCT Pub. No.: WO2019/111518
PCT Pub. Date: Jun. 13, 2019

(65) Prior Publication Data
US 2020/0384966 A1 Dec. 10, 2020

(30) Foreign Application Priority Data
Dec. 4, 2017 (JP) .............................. JP2017-232291

(51) Int. Cl.
*B60T 8/17* (2006.01)
*B60T 8/172* (2006.01)
(Continued)

(52) U.S. Cl.
CPC .............. *B60T 8/172* (2013.01); *B60T 8/329* (2013.01); *B60T 8/171* (2013.01); *B60T 13/686* (2013.01);
(Continued)

(58) Field of Classification Search
CPC .......... B60T 8/172; B60T 8/329; B60T 8/171; B60T 13/686; B60T 2220/04;
(Continued)

(56) References Cited

U.S. PATENT DOCUMENTS

2004/0054450 A1 3/2004 Nakamura et al.
2004/0256911 A1 12/2004 Hatano et al.
(Continued)

FOREIGN PATENT DOCUMENTS

DE 3638837 C2 * 9/1993 ............ B60T 13/686
JP 2000-255403 A 9/2000
(Continued)

OTHER PUBLICATIONS

International Search Report, PCT/JP2018/037403, dated Jan. 15, 2019, 2 pgs.

*Primary Examiner* — Mary Cheung
(74) *Attorney, Agent, or Firm* — Volpe Koenig

(57) ABSTRACT

A brake system capable of accurately controlling a braking force includes a first and second brake devices that have different control accuracies, and a brake control device that controls a braking force of the first and second braking devices according to a required braking force. The brake control device has a first control mode in which the braking force of the first brake device is controlled to be smaller than the braking force of the second brake device, and a second control mode in which the braking force of the first brake device is increased rather than the first control mode. The second brake device is controlled so that a sum of the braking force of the first brake device and the braking force of the second brake device matches the required braking force.

15 Claims, 10 Drawing Sheets

(51) Int. Cl.
*B60T 8/32* (2006.01)
*B60T 8/171* (2006.01)
*B60T 13/68* (2006.01)

(52) U.S. Cl.
CPC ....... *B60T 2220/04* (2013.01); *B60Y 2400/81* (2013.01)

(58) Field of Classification Search
CPC .... B60T 13/146; B60T 13/662; B60T 8/1766; B60T 8/1761; B60Y 2400/81
See application file for complete search history.

(56) References Cited

U.S. PATENT DOCUMENTS

| | | | |
|---|---|---|---|
| 2009/0256417 A1 | 10/2009 | Ishii et al. | |
| 2014/0375113 A1* | 12/2014 | Higashi | B60T 13/58 303/10 |
| 2017/0232849 A1 | 8/2017 | Yamamoto et al. | |

FOREIGN PATENT DOCUMENTS

| | | | | |
|---|---|---|---|---|
| JP | 2002-211374 A | | 7/2002 | |
| JP | 2004-155403 A | | 6/2004 | |
| JP | 2004-351965 A | | 12/2004 | |
| JP | 2009-208518 A | | 9/2009 | |
| JP | 4587501 B2 | * | 11/2010 | ............ B60T 17/221 |
| JP | 2017-144807 A | | 8/2017 | |
| JP | 2019098903 A | * | 6/2019 | |
| WO | WO-2017017490 A1 | * | 2/2017 | ............ B60T 13/588 |

* cited by examiner

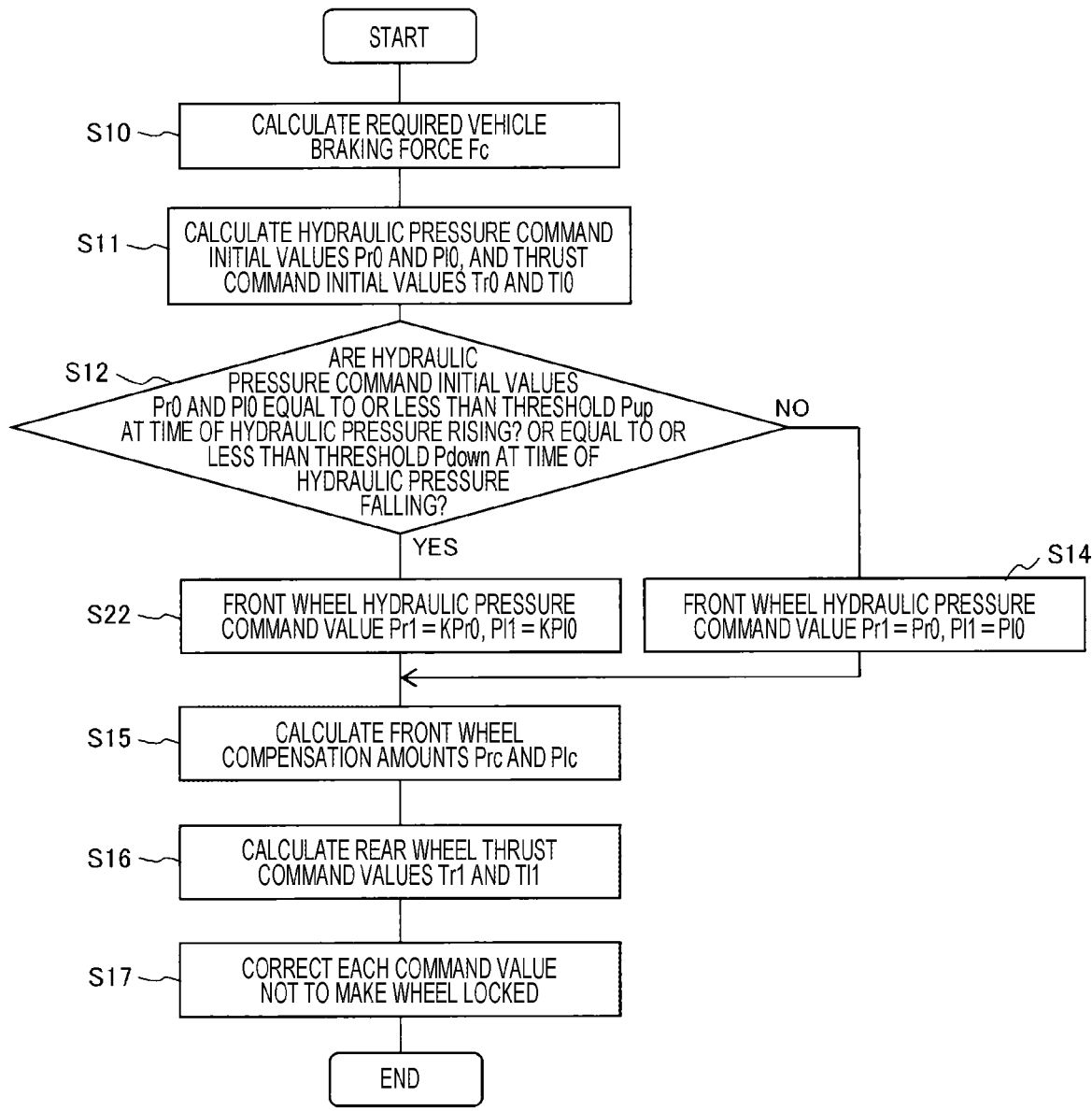

BRAKE SYSTEM AND CONTROL METHOD OF BRAKE SYSTEM

TECHNICAL FIELD

The present invention relates to a brake control device for controlling a brake device of a vehicle and a control method thereof, and particularly to a technique effective when applied to a brake system equipped with a brake device having a different control accuracy of braking force between front and rear wheels.

BACKGROUND ART

PTL 1 discloses a brake device that generates a braking force by using a hydraulic mechanism on a front wheel side of a vehicle and an electric mechanism on a rear wheel side of the vehicle. In this conventional technology (PTL 1), there is disclosed a brake control device in which a braking force responsiveness of the entire vehicle is improved by generating the braking force by the electric mechanism on the rear wheel side ahead of a delay in the braking force generation by the hydraulic mechanism on the front wheel side, and a brake feeling at the start of operation of a brake pedal is improved.

Further, PTL 2 discloses that "a cooperative control device for a compound brake includes a first brake unit responsive to a first braking force command value, and a second brake unit responsive to a second braking force command value. The second brake unit is used for the composite brake having a lower control responsiveness than the first brake unit. When correcting the first braking force command value related to the first brake unit having fast control responsiveness, the first braking force command value is corrected according to a difference in braking force between an actual braking force estimation value related to the second brake unit having poor control responsiveness and similarly a reference model response value of the second braking force command value related to the second brake unit."

CITATION LIST

Patent Literature

PTL 1: JP 2009-208518 A
PTL 2: JP 2004-155403 A

SUMMARY OF INVENTION

Technical Problem

By the way, in such a brake device having a hydraulic mechanism on the front wheel side and an electric mechanism on the rear wheel side, there is a configuration which has no mechanical connection using hydraulic pressure between a hydraulic mechanism constituted by a pump and a valve on the front wheel side and a brake pedal, and a configuration in which the valve is normally disconnected by closing a valve connecting the hydraulic mechanism and the brake pedal. In this case, the hydraulic mechanism and the electric mechanism are controlled based on a control amount such as a required braking force calculated based on a stroke of the brake pedal or a pedaling force sensor signal or a required braking force from a vehicle control device provided at an upper level of the brake control device.

In such a configuration, the pump or valve is driven in accordance with the required braking force to generate hydraulic pressure. However, with a general pump, due to the instability of the flow rate during low-speed rotation, a low control accuracy of a valve for adjusting a pump discharge pressure, and an influence of liquid compression, the control accuracy of the braking force is low especially at the time of low pressure driving.

Therefore, due to a sudden increase in hydraulic pressure immediately after the braking request is generated, or a phenomenon peculiar to the hydraulic mechanism that the hydraulic pressure remains even though the required braking force is zero, the braking force differs from that assumed by the driver or upper-level control device, and the occupant may feel uncomfortable.

However, in the method described in PTL 1, it is difficult to solve these problems because the hydraulic mechanism for the front wheels does not perform any control on the required braking force.

Further, in the method described in PTL 2, the responsiveness of the cooperative control to the fluctuation of the required braking force during the brake operation is insufficient, and the occupant may feel uncomfortable.

Accordingly, a main object of the invention is to provide a brake system and a control method which can accurately control a braking force in accordance with a required braking force of a driver or an upper-level control device in a vehicle equipped with a plurality of brake devices having different braking force control accuracy on the front and rear wheels.

Solution to Problem

In order to solve the above problem, the invention provides a brake device which includes a first brake device, a second brake device that has a different control accuracy of the braking force from the first brake device, and a brake control device that controls a braking force of the first brake device and a braking force of the second brake device according to a required braking force. The brake control device has a first control mode in which the braking force of the first brake device is controlled to be smaller than the braking force of the second brake device, and a second control mode in which the braking force of the first brake device is increased rather than the first control mode. The second brake device is controlled so that a sum of the braking force of the first brake device and the braking force of the second brake device matches the required braking force.

Further, the invention provides a brake system which includes a first brake device, a second brake device that has a different control accuracy of the braking force from the first brake device, and a brake control device that controls a braking force of the first brake device and a braking force of the second brake device according to a required braking force. The brake control device has a third control mode in which the braking force is reduced in accordance with a braking force reduction command, and a fourth control mode in which the braking force of the first brake device is reduced rather than the third control mode. The second brake device is controlled so that a sum of the braking force of the first brake device and the braking force of the second brake device matches the required braking force.

Further, the invention provides a control method for a brake system which includes a hydraulic brake device disposed on a front wheel of a vehicle, and an electric brake device disposed on a rear wheel of the vehicle. The control method includes (a) calculating a required vehicle braking force of the vehicle, (b) calculating a hydraulic pressure command initial value of the hydraulic brake device and a thrust command initial value of the electric brake device based on the calculated required vehicle braking force, (c) performing a comparison between the hydraulic pressure command initial value and a predetermined threshold to determine a control accuracy of the hydraulic brake device, (d) when it is determined that the control accuracy of the hydraulic brake device is low, correcting the hydraulic pressure command initial value, (e) calculating a front wheel compensation amount based on the hydraulic pressure command initial value and a hydraulic pressure of the hydraulic brake device, (f) calculating a thrust command value based on the front wheel compensation amount, the thrust command initial value of the electric brake device, and a measured thrust, and (g) correcting the hydraulic pressure command value of the hydraulic brake device and the thrust command value of the electric brake device so as to prevent wheel lock, based on each wheel speed of the front wheel and the rear wheel.

Further, the invention provides a braking system which includes a first brake device, a second brake device that has a different control accuracy of the braking force from the first brake device, and a brake control device that controls a braking force of the first brake device and a braking force of the second brake device according to a required braking force. When the required braking force is equal to or less than a predetermined value, the braking force of the first brake device is limited. The braking force of the second brake device is increased to satisfy the required braking force.

In addition, a feature of the invention is that, in a vehicle equipped with brake devices having different braking force control accuracy on the front and rear wheels, correction is performed so as to suppress the operation of the brake device having a lower braking force control accuracy in a region where the required braking force is small. Then, the braking force of the brake device with a higher braking force control accuracy is adjusted so that the corrected braking force matches the required braking force.

Advantageous Effects of Invention

According to the invention, it is possible to realize a brake system and a control method which can accurately control a braking force in accordance with a required braking force of a driver or an upper-level control device in a vehicle equipped with a plurality of brake devices having different braking force control accuracy on the front and rear wheels.

Thereby, a riding comfort of the vehicle at the time of the brake operation is improved, and the comfort of the occupant is improved.

Objects, configurations, and effects besides the above description will be apparent through the explanation on the following embodiments.

BRIEF DESCRIPTION OF DRAWINGS

FIG. 10 is a flowchart illustrating a control method of the brake device according to one embodiment of the invention. (Fourth Embodiment)

DESCRIPTION OF EMBODIMENTS

Figure 1:
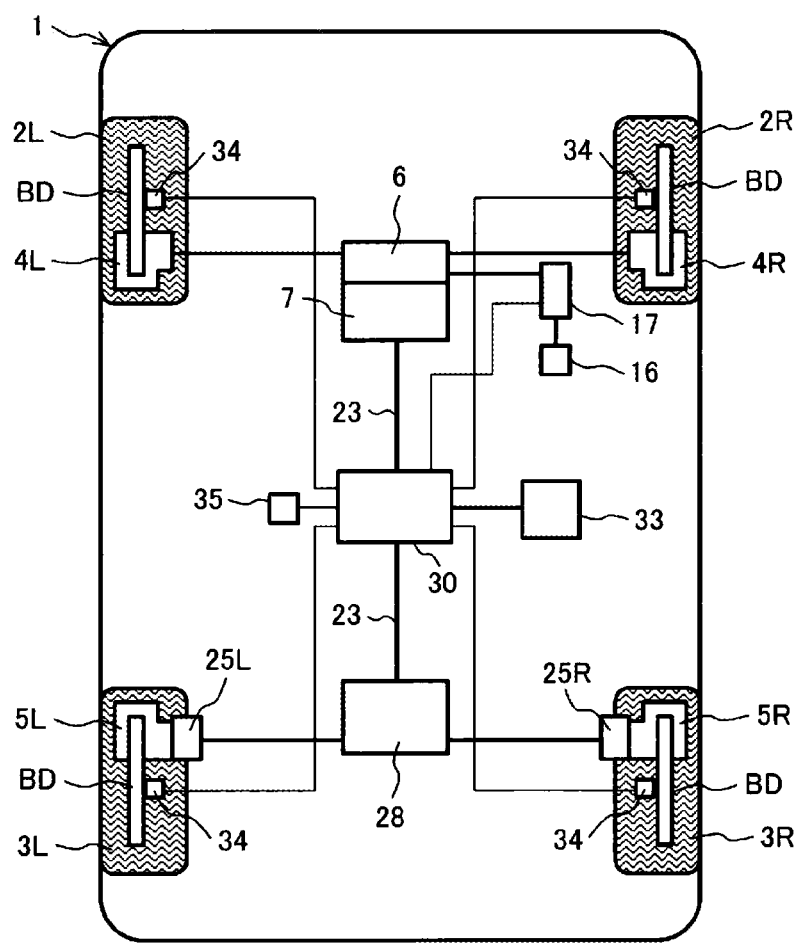
FIG. 1 is a diagram illustrating a schematic configuration of a brake device of a vehicle according to an embodiment of the invention.

Hereinafter, embodiments of the invention will be described in detail using the drawings. In the drawings, the same components are denoted by the same reference numerals, and detailed description of overlapping portions will be omitted. In addition, the invention is not limited to the following embodiments, and various modifications and applications may be included in the scope of the technical ideas of the invention.

First Embodiment

Figure 2:
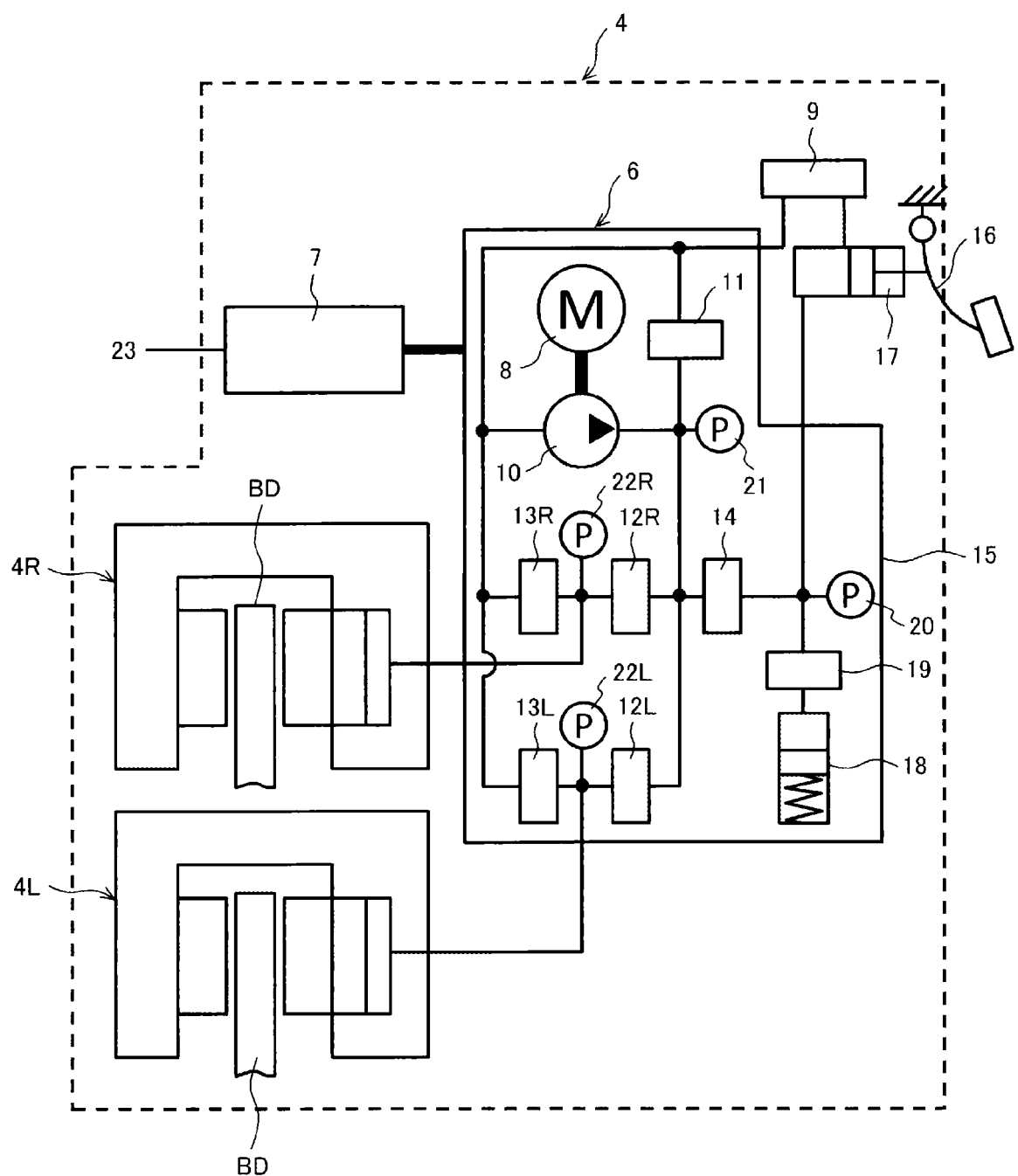
FIG. 2 is a diagram illustrating a schematic configuration of a front wheel side braking mechanism of the brake device in FIG. 1.
Figure 3:
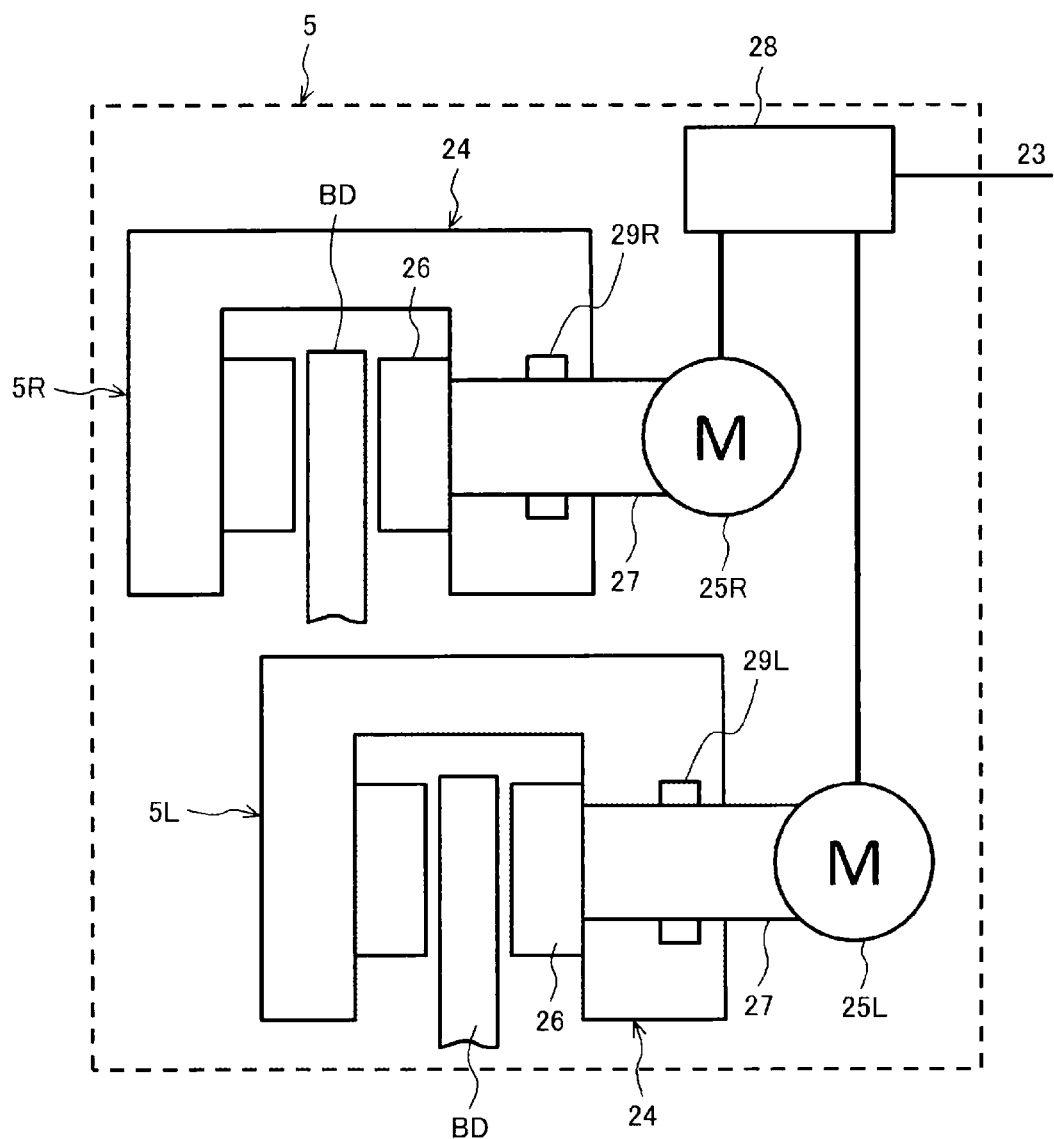
FIG. 3 is a diagram illustrating a schematic configuration of a rear wheel side braking mechanism of the brake device illustrated in FIG. 1.
Figure 4:
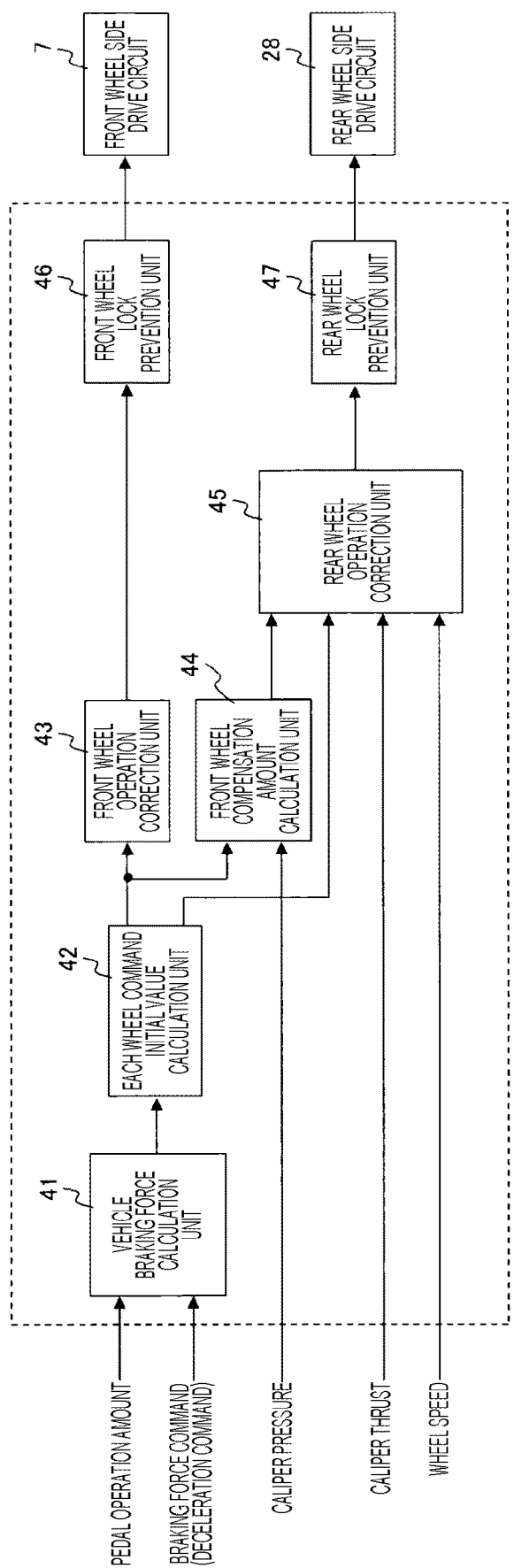
FIG. 4 is a block diagram illustrating control by a brake control device according to one embodiment of the invention.
Figure 5:
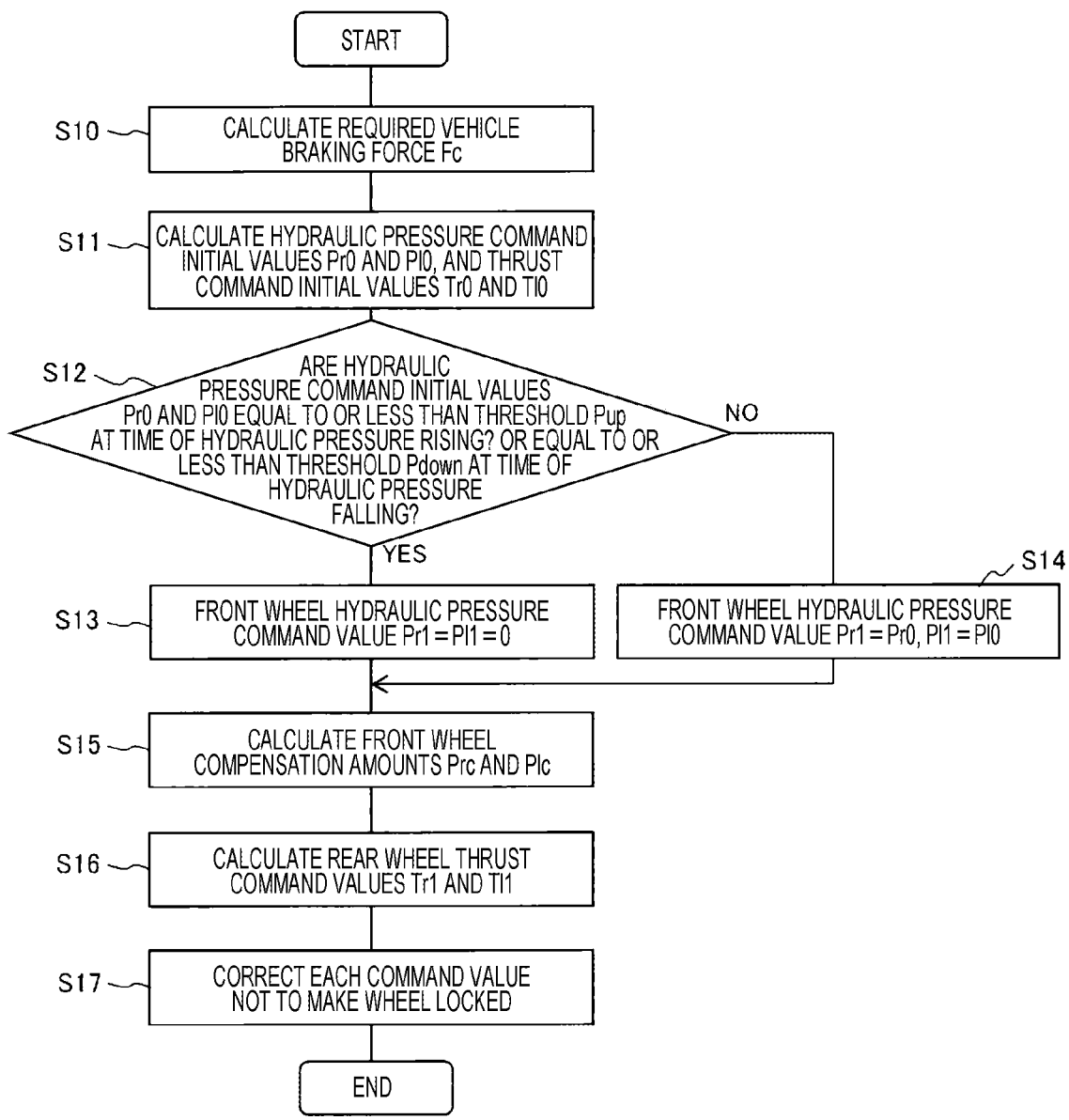
FIG. 5 is a flowchart illustrating a control method of the brake device according to one embodiment of the invention. (First Embodiment)
Figure 6:
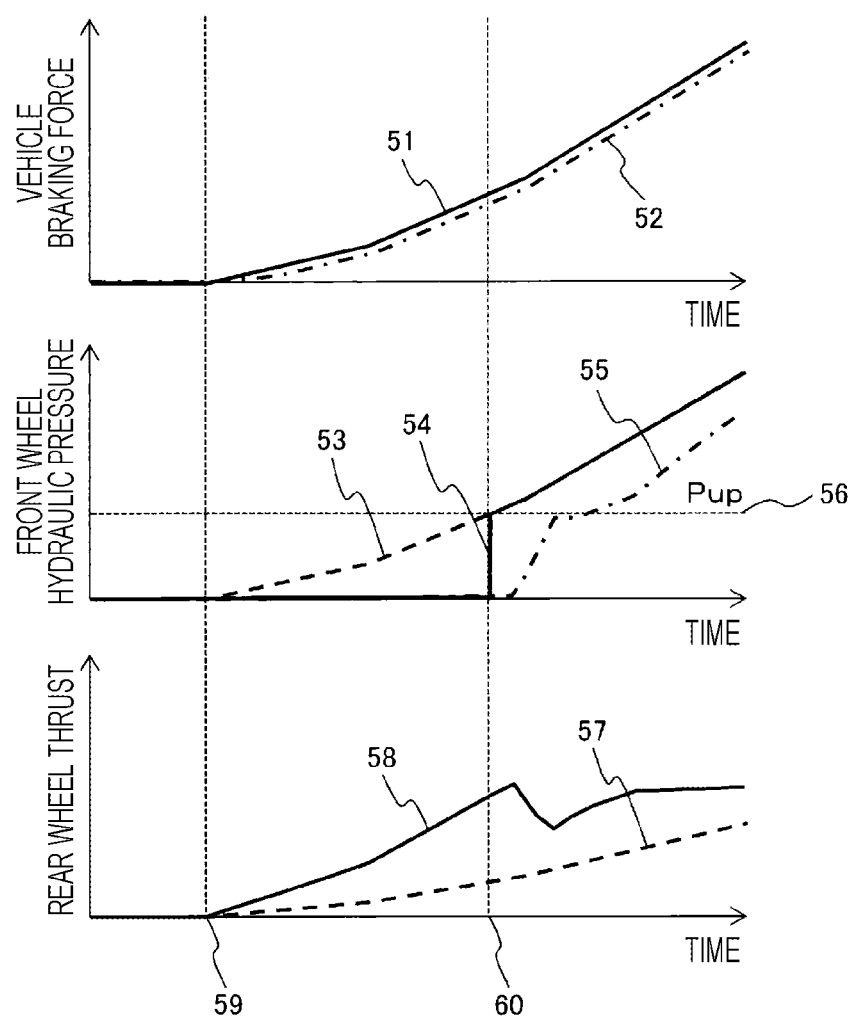
FIG. 6 is a diagram illustrating an operation when a braking force is increased by the control method illustrated in FIG. 5.
Figure 7:
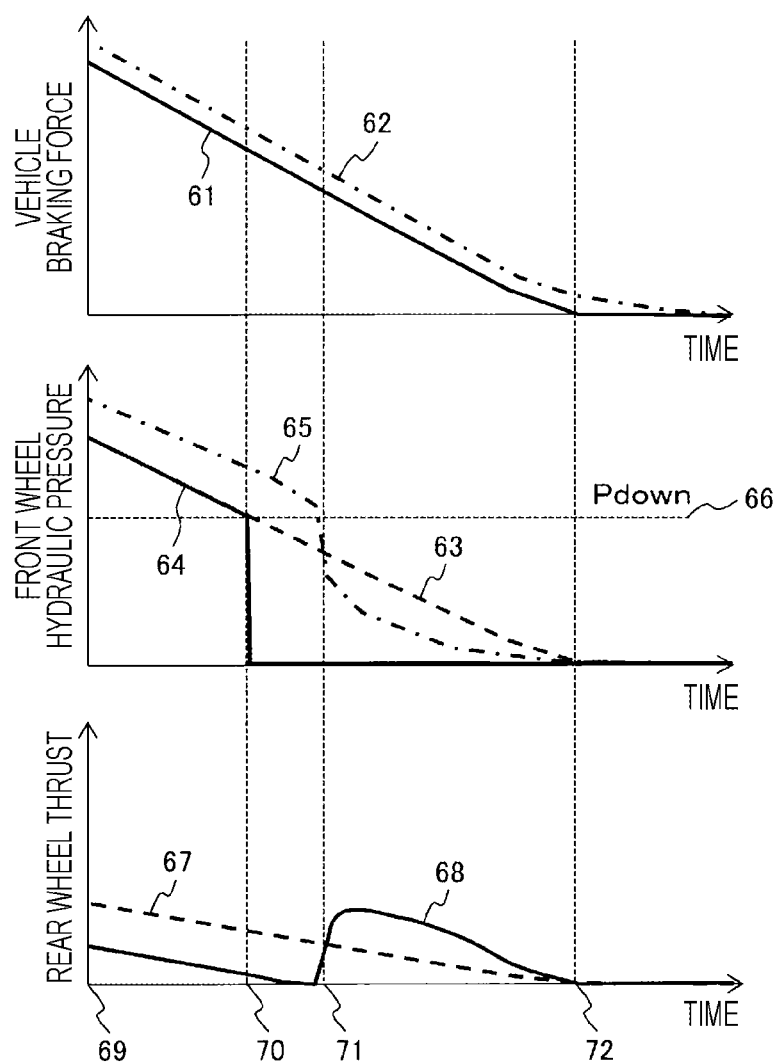
FIG. 7 is a diagram illustrating an operation when the braking force is decreased by the control method illustrated in FIG. 5.

With reference to FIGS. 1 to 7, a vehicle brake system and a control method thereof according to a first embodiment of the invention will be described. FIG. 1 illustrates a schematic configuration of a vehicle brake device according to this embodiment, and FIGS. 2 and 3 illustrate schematic configurations of respective braking mechanisms on a front wheel side and a rear wheel side in FIG. 1. FIG. 4 is a block diagram illustrating the control executed by the brake control device of this embodiment, and FIG. 5 is a flowchart illustrating the control flow. FIGS. 6 and 7 illustrate operations when the braking force is increased and when the braking force is decreased by the control method illustrated in FIG. 5, respectively.

In FIG. 1, a vehicle 1 includes a pair of front wheels 2R and 2L and a pair of rear wheels 3R and 3L, and also includes a front wheel side braking mechanism 4 for applying a braking force to the front wheels 2R and 2L (see FIG. 2) and a rear wheel side braking mechanism 5 (see FIG. 3) for applying a braking force to the rear wheels 3R and 3L.

In this embodiment, the front wheel side braking mechanism is configured by hydraulic disk brakes (hydraulic brake mechanisms) 4R and 4L that are operated by a brake hydraulic pressure with a brake disk BD interposed therebetween, and a front wheel side electric hydraulic mechanism 6 that generates the brake hydraulic pressure, and a front wheel side drive circuit 7.

In addition, the rear wheel side braking mechanism 5 is configured by electric disk brakes (electric brake mechanisms) 5R and 5L which are operated by the rotation of brake electric motors 25R and 25L to interpose the brake disk BD, and a rear wheel side drive circuit 28 which drives the brake electric motors 25R and 25L.

Further, a brake control device 30 that controls the front wheel side drive circuit 7 and the rear wheel side drive circuit 28 and adjusts the braking force generated by the vehicle 1 is provided.

For example, as illustrated in FIG. 2, the front wheel side electric hydraulic mechanism 6 includes a hydraulic pump 10 which is a hydraulic pressure source driven by a pump electric motor 8, which is an electric component element, and pressurizes brake fluid in a reservoir tank 9, an electromagnetic pressure regulating valve 11 for adjusting the brake hydraulic pressure of the hydraulic pump 10, electromagnetic inflow valves 12R and 12L for regulating the brake fluid flowing into hydraulic disk brakes 4R and 4L, an electromagnetic outflow valves 13R and 13L for regulating the brake fluid flowing out, and a hydraulic circuit system 15 configured by an electric component element such as an electromagnetic shut-off valve 14 for shutting off the brake pedal 16 side. Further, the front wheel side electric hydraulic mechanism 6 and the hydraulic circuit system 15 are surrounded by the same frame.

Further, the front wheel side braking mechanism 4 illustrated in FIG. 2 includes a master cylinder 17 that operates using a brake pedal 16 operated by a driver as a power source separately from the front wheel side electric hydraulic mechanism 6. The master cylinder 17 is connected to the hydraulic disk brakes 4R and 4L by the hydraulic circuit system 15, and opens the electromagnetic shut-off valve 14 and the electromagnetic inflow valves 12R and 12L to operate the hydraulic disk brakes 4R and 4L by the brake hydraulic pressure generated by the master cylinder 17, thereby braking the vehicle 1.

A master cylinder pressure sensor 20 is provided in the hydraulic circuit system 15, a pump pressure sensor 21 is provided on the discharge side of the hydraulic pump 10, and caliper pressure sensors 22R and 22L are provided in the hydraulic circuit directed to the disk brakes 4R and 4L, which can detect the hydraulic pressure of each part of the hydraulic circuit.

Further, there is provided a stroke simulator 18 which gives an appropriate reaction force to the driver in response to an operation of the brake pedal 16 when the electromagnetic shut-off valve 14 is in the closed state, and absorbs the brake hydraulic pressure discharged from the master cylinder 17. Further, the hydraulic circuit system 15 leading to the stroke simulator 18 includes an electromagnetic stroke simulator valve 19 which adjusts the inflow and outflow of the brake fluid to the stroke simulator 18. In the front wheel side braking mechanism 4, the electric component elements, the pump electric motor 8, and the electromagnetic control valves 11, 12R, 12L, 13R, 13L, 14, and 19 which function as electromagnetic hydraulic control valves are controlled by the front wheel side drive circuit 7.

A control signal line 23 is connected to the front wheel side drive circuit 7. The control signal line 23 inputs control command information such as a hydraulic pressure command value for each wheel from the brake control device 30 (see FIG. 1) to the front wheel side drive circuit 7, and outputs drive state information such as a current value of the pump electric motor 8 of the front wheel side braking mechanism 4 and a voltage of each part of the hydraulic circuit to the brake control device 30.

Further, in this embodiment, the rear wheel side braking mechanism 5 includes the electric disk brakes 5R and 5L. Here, the electric disk brakes 5R and 5L have the same configuration. For example, as illustrated in FIG. 3, a rear wheel side electric mechanism 24 presses the brake pad 26 to the brake disk BD by the brake electric motors 25R and 25L to generate a pressing force to generate a braking force. The torque of the brake electric motors 25R and 25L is converted into a linear motion by a rotation/linear motion conversion mechanism 27, and the brake pad 26 is pressed against the brake disk BD to apply a braking force.

Here, in order to adjust the pressing force of the brake pad 26, the rotation of the brake electric motors 25R and 25L is controlled by the rear wheel side drive circuit 28 based on the pressing force detected by thrust sensors 29R and 29L. Here, the rotation/linear motion conversion mechanism 27 converts a rotary motion into a linear motion by employing, for example, a feed screw mechanism.

Further, similarly to the front wheel side drive circuit 7, the control signal line 23 is connected to the rear wheel side drive circuit 28. The control signal line 23 inputs control command information from the brake control device 30 to the rear wheel side drive circuit 28, and outputs the drive state information such as the pressing force of the rear wheel side braking mechanism 5 and the current values of the brake electric motors 25R and 25L to the brake control device 30.

Returning to FIG. 1, information on the operation amount of the brake pedal 16 (stroke, pedaling force, etc. of the brake pedal) is transmitted to the brake control device 30. Further, wheel rotation speed sensors 34 are attached to the front wheels 2R and 2L and the rear wheels 3R and 3L of the vehicle 1, and transmit wheel speed information to the brake control device 30. A vehicle motion sensor 35 also detects vehicle behavior information such as the acceleration and the yaw rate of the vehicle 1, and transmits the information to the brake control device 30.

In addition to this, the vehicle 1 includes an upper-level control device 33 which calculates an appropriate braking amount of the vehicle 1 based on one or more pieces of information such as external information from cameras and radars, map information from a navigation system, operation state information such as driving devices, steering devices, and brake devices in the vehicle 1, and motion state information of the vehicle 1, and transmits the vehicle braking amount as a control command information to the brake control device 30.

In the brake control device 30 mounted on such a vehicle 1, a control command is transmitted to the front wheel side drive circuit 7 and the rear wheel side drive circuit 28 based on operation information obtained from a stroke of brake pedal 16 of the driver and a master cylinder pressure sensor 20, wheel speed information of the front and rear wheels obtained from the wheel rotation speed sensor 34, vehicle behavior information of the vehicle 1 obtained from the vehicle motion sensor 35, and control command information of the upper-level control device 33. The operations of the front wheel side braking mechanism 4 and the rear wheel side braking mechanism 5 are controlled.

In the case of this embodiment, the front wheel side braking mechanism 4 normally closes the electromagnetic shut-off valve 14 to disconnect the connection between the master cylinder 17 and the hydraulic disk brakes 4R and 4L, and opens the electromagnetic stroke simulator valve 19 to absorb the brake hydraulic pressure discharged by the driver's operation of the brake pedal 16.

At the same time, the brake control device 30 calculates a control amount corresponding to the braking force generated in the front wheels 2R and 2L and the rear wheels 3R and 3L based on the operation information of the brake pedal 16, the wheel speed information and the vehicle behavior information of the vehicle 1, the control command information of the upper-level control device 33, and the operation state information of the electric disk brakes 5R and 5L on the rear wheels 3R and 3L side, and transmits the control amount to the front wheel side drive circuit 7 and the rear wheel side drive circuit 28.

The front wheel side drive circuit 7 of the front wheel side braking mechanism 4 controls the operations of the pump electric motor 8, the electromagnetic pressure regulating valve 11, the electromagnetic inflow valves 12R and 12L, and the electromagnetic outflow valves 13R and 13L based on a control amount command value of the brake control device 30 so as to cause the hydraulic disk brakes 4R and 4L to generate a braking force.

On the other hand, the rear wheel side drive circuit 28 of the rear wheel side braking mechanism 5 controls the operation of the brake electric motors 25R and 25L based on the control amount command value of the brake control device 30, and adjusts the braking force of the electric disk brakes 5R and 5L.

In the brake device that performs the above operation, the front wheel side braking mechanism 4 and the rear wheel side braking mechanism 5 have different power sources and mechanisms, so that a difference occurs in control accuracy such as responsiveness and linearity.

In the following description, the rear wheel side braking mechanism 5 that operates without using hydraulic pressure has better control accuracy (such as responsiveness and linearity) than the front wheel side braking mechanism 4 that operates using hydraulic pressure.

In the case of such a configuration, regarding the control performed by the brake control device 30 for the purpose of improving the control accuracy of the braking force of the vehicle 1, the description will be made based on the control block diagram in the brake control device 30 illustrated in FIG. 4 and the control flow illustrated in FIG. 5. The control block diagram of FIG. 4 illustrates an example of a control block mounted in the brake control device 30 to realize the control described in this embodiment. Further, the control flow illustrated in FIG. 5 indicates the control performed by the brake control device 30 based on a required braking force, and is assumed to be started at predetermined time intervals.

<<Step S10>>

First, in Step S10, a vehicle braking force calculation unit 41 calculates a required vehicle braking force Fc, which is required by the driver or the upper-level control device 33 and is the braking force of the vehicle, based on the operation amount of the brake pedal 16 and the braking force command (deceleration command) of the upper-level control device 33, and the process proceeds to Step S11.

<<Step S11>>

Next, in Step S11, each wheel command initial value calculation unit 42 calculates hydraulic pressure command initial values Pr0 and Pl0 for the front wheel side braking mechanism 4 and thrust command initial values Tr0 and Tl0 for the rear wheel side braking mechanism 5 based on the required vehicle braking force Fc, and the process proceeds to Step S12.

For example, assuming that the ratio of the braking force generated by the front wheels to the required vehicle braking force Fc is Q, the braking force hydraulic pressure conversion coefficient is Kp, and the braking force thrust conversion coefficient is Kt, the hydraulic pressure command initial values Pr0 and Pl0 for the left and right hydraulic disk brakes 4R and 4L and the thrust command initial values Tr0 and Tl0 for the left and right electric disk brakes 5R and 5L may be calculated using Expressions (1) and (2).

[Math. 1]

$$Pr0=Pl0=QKpFc/2 \quad (1)$$

[Math. 2]

$$Tr0=Tl0=(1-Q)KtFc/2 \quad (2)$$

<<Step S12>>

Subsequently, in Step S12, when the hydraulic pressure command initial values Pr0 and Pl0 are rising by a front wheel operation correction unit 43, these values are compared with a threshold Pup at the time of the rising hydraulic pressure. When falling, the hydraulic pressure command initial values Pr0 and Pl0 are compared with a threshold Pdown at the time of the falling hydraulic pressure. When the pressure is equal to or less than the threshold at the time of increase or decrease (YES), it is determined that the pressure control accuracy is low, and the process proceeds to Step S13, or if not (NO), the process proceeds to Step S14.

Here, the threshold Pup at the time of the rising hydraulic pressure may be set, for example, according to the differential pressure before and after the electromagnetic pressure regulating valve 11 when the electromagnetic pressure regulating valve 11 is fully opened, which occurs when the hydraulic pump 10 is rotating normally. Further, the threshold Pdown at the time of the falling hydraulic pressure may be determined based on the time required to decrease the pressure from the hydraulic disk brakes 4R and 4L using the electromagnetic outflow valves 13R and 13L.

<<Step S13>>

In Step S13, since the front wheel operation correction unit 43 has determined that the pressure control accuracy of the front wheel side braking mechanism 4 is low, the hydraulic pressure command initial values Pr0 and Pl0 are corrected, and hydraulic pressure command values Pr1 and Pl1 for commanding the front wheel side braking mechanism 4 is newly calculated. The hydraulic pressure command values Pr1 and Pl1 at this time may be set to zero, for example, so that the front wheel side braking mechanism 4 does not operate.

<<Step S14>>

On the other hand, in Step S14, since the front wheel operation correction unit 43 has determined that the pressure control accuracy of the front wheel side braking mechanism 4 is high, the hydraulic pressure command values Pr1 and Pl1 are calculated as the same as the hydraulic pressure command initial values Pr0 and Pl0.

<<Step S15>>

Subsequently, in Step S15, a front wheel compensation amount calculation unit 44 receives the front wheel command initial values Pr0 and Pl0 and caliper pressures Pr and Pl measured by the caliper pressure sensors 22R and 22L, and calculates front wheel compensation amounts Prc and Plc. For example, the front wheel compensation amounts Prc and Plc may be obtained by Expressions (3) and (4).

[Math. 3]

$$Prc=Ca(Pr0-Pr) \quad (3)$$

[Math. 4]

$$Plc=Ca(Pl0-Pl) \quad (4)$$

Here, Ca indicates a compensation gain, which is an arbitrary value.

<<Step S16>>

Subsequently, in Step S16, a rear wheel operation correction unit 45 captures the left and right wheel thrust command initial values Tr0 and Tl0, the front wheel compensation amounts Prc and Plc, and caliper thrusts Tr and Tl measured by the thrust sensors 29R and 29L, and calculate thrust command values Tr1 and Tl1 of the left and right wheel. The thrust command values Tr1 and Tl1 may be obtained by, for example, Expressions (5) and (6).

[Math. 5]

$$Tr1 = Tr0 + Cb \cdot Prc \quad (5)$$

[Math. 6]

$$Tl1 = Tl0 + Cb \cdot Plc \quad (6)$$

Here, Cb is a coefficient that converts the braking force equivalent to the braking force generated by the pressure applied to the hydraulic disk brakes 4R and 4L of the front wheels into the thrust required to be generated by the electric disk brakes 5R and 5L of the rear wheels.

<<Step S17>>

Lastly, in Step 17, the hydraulic pressure command values Pr1 and Pl1 of the front wheel and the thrust command values Tr1 and Tl1 of the rear wheel are corrected based on the wheel speed of each wheel measured by the wheel rotation speed sensor 34 such that a front wheel lock prevention unit 46 and a rear wheel lock prevention unit 47 prevents the wheel lock For example, a slip rate may be calculated from the wheel speed of each wheel, and when the slip rate becomes equal to or more than a predetermined value, the hydraulic pressure command value and the thrust command value may be corrected to be small.

The corrected hydraulic pressure command values Pr1 and Pl1 of the front wheel and the thrust command values Tr1 and Tl1 of the rear wheel are input to the front wheel side drive circuit 7 and the rear wheel side drive circuit 28, respectively, and the front wheel side braking mechanism 4 and the rear wheel side braking mechanism 5 are controlled based on the command values, thereby adjusting the braking force of the vehicle 1.

In the control flow described above, there may be set a function (operation) such that a predetermined value (threshold) is set in advance for the required vehicle braking force Fc, and when the required vehicle braking force Fc calculated in Step S10 is equal to or less than the predetermined value (threshold), the braking force of the front wheel side braking mechanism 4 (the hydraulic disk brakes 4R and 4L) is limited, and the braking force of the rear wheel side braking mechanism 5 (the electric disk brakes 5R and 5L) is increased to satisfy the required vehicle braking force Fc. By setting a predetermined value (threshold) for the required vehicle braking force Fc in advance based on test data or the like, more reliable control can be performed.

FIG. 6 illustrates an operation when the braking force of the brake device including the brake control device 30 that performs the above control is increased, and FIG. 7 illustrates an operation when the braking force is decreased.

The upper diagram in FIG. 6 illustrates the vehicle braking force, the center diagram illustrates the front wheel hydraulic pressure, and the lower diagram illustrates the temporal change of the rear wheel thrust. The required vehicle braking force Fc calculated by the vehicle braking force calculation unit 41 is indicated by a solid line 51 in the upper diagram. The hydraulic pressure command initial values Pr0 and Pl0 and thrust command initial values Tr0 and Tl0 are calculated in Step S10 according to the solid line 51 of the required vehicle braking force Fc. The hydraulic pressure command initial value Pr0 calculated by the calculation is indicated by a broken line 53 in the center diagram, and the thrust command initial value Tr0 is indicated by a broken line 57 in the lower diagram. Assuming that the command values of the left and right wheels are substantially the same during straight-ahead braking or the like, FIG. 6 illustrates only the broken line 53 of the hydraulic pressure command initial value Pr0 and the broken line 57 of the thrust command initial value Tr0.

In the center diagram of FIG. 6, the hydraulic pressure command value Pr1 calculated by the front wheel operation correction unit 43 is indicated by a solid line 54, and the hydraulic pressure for driving the hydraulic disk brake 4R detected by the caliper pressure sensor 22R is indicated by a chain line 55. In the lower diagram of FIG. 6, the thrust command value Tr1 calculated by the rear wheel operation correction unit 45 is indicated by a solid line 58.

As illustrated in FIG. 6, as the solid line 51 of the required vehicle braking force Fc at time 59 increases, the hydraulic pressure command initial value Pr0 and the thrust command initial value Tr0 also increase. Until time 60, as described in Steps S12 and S13, the hydraulic pressure command initial value Pr0 is equal to or less than a hydraulic pressure rise threshold Pup56, so that the hydraulic pressure command value Pr1 is held at 0 as illustrated by the solid line 54. Therefore, the chain line 55 of the sensor detection pressure Pr also remains at 0 until time 60, the thrust command value Tr1 of the rear wheel is increased as indicated by the solid line 58 in order to generate a braking force equivalent to the braking force generated by the hydraulic disk brake 4R of the front wheels as described in Steps S15 and S16. (Here, the control from time 59 to time 60 is referred to as "first control mode".)

When the hydraulic pressure command initial value Pr0 of the front wheels exceeds the hydraulic pressure rise threshold Pup56 at time 60, the solid line 54 is matched with the broken line 53 in order to set the hydraulic pressure command value Pr1=Pr0. As the hydraulic pressure command value Pr1 increases, the chain line 55 of the sensor detection pressure Pr, which is the actual hydraulic pressure, also increases, or the increase amount increases. Here, since the hydraulic pressure generated by the front wheel side braking mechanism 4 has a large response delay to the command, the hydraulic pressure follows the hydraulic pressure command value Pr1 with a delay as illustrated by the chain line 55. Therefore, even after the time 60 has elapsed, the thrust command value Tr1 for the rear wheel is corrected according to the difference between the hydraulic pressure command value Pr1 and the sensor detection pressure Pr. (Here, the control after the time 60 has elapsed is referred to as "second control mode".)

As a result of this processing, the actual vehicle braking force follows the solid line of the required vehicle braking force Fc with a response delay of the electric disk brake as illustrated by a chain line 52 in the upper diagram of FIG. 6.

FIG. 7 illustrates the respective state quantities and command values when the braking force is lowered. The upper diagram illustrates the vehicle wheel braking force, the center diagram illustrates the front wheel hydraulic pressure, and the lower diagram illustrates the temporal change of the rear wheel thrust. The required vehicle braking force Fc calculated by the vehicle braking force calculation unit 41 is indicated by a solid line 61 in the upper diagram. In Step S11, the hydraulic pressure command initial values Pr0 and Pl0 and the thrust command initial values Tr0 and Tl0 are calculated in accordance with the solid line 61 of the required vehicle braking force Fc. The hydraulic pressure command initial value Pr0 calculated by the calculation is indicated by a broken line 63 in the center diagram, and the thrust command initial value Tr0 is indicated by a broken line 67 in the lower diagram. In FIG. 7, assuming that the command values of the left and right wheels are substantially the same, and illustrates only the broken line 63 of the hydraulic pressure command initial value Pr0 and the broken line 67 of the thrust command initial value Tr0.

In the center diagram of FIG. 7, the hydraulic pressure command value Pr1 calculated by the front wheel operation correction unit 43 is indicated by a solid line 64, and the hydraulic pressure for driving the hydraulic disk brake 4R detected by the caliper pressure sensor 22R is indicated by a chain line 65. In the lower diagram of FIG. 7, the thrust command value Tr1 calculated by the rear wheel operation correction unit 45 is indicated by a solid line 68.

As illustrated in the upper diagram of FIG. 7, in the section from time 69 to time 72, the required vehicle braking force Fc calculated by a vehicle braking force calculation unit 41 based on the operation of the upper-level control device 33 or the brake pedal 16 decreases. In the section from time 69 to time 70, it is determined in Step S12 that the hydraulic pressure command initial value Pr0 is larger than a threshold Pdown66 at the time of the falling hydraulic pressure, and in Step S14, the broken line 63 and the solid line 64 are matched to set the hydraulic pressure command value Pr1 to Pr1=Pr0.

On the other hand, since the hydraulic pressure generated by the front wheel side braking mechanism 4 has a large response delay to the command, the hydraulic pressure follows the hydraulic pressure command value Pr1 with a delay as illustrated by the chain line 65. With this regard, in the section from time 69 to time 70, as illustrated in Step S15, the front wheel compensation amount calculation unit 44 calculates the difference between the sensor detection pressure Pr and the hydraulic pressure command value Pr1, and corrects the thrust command value Tr1 of the rear wheel according to the difference. As a result, the thrust command value Tr1 indicated by the solid line 68 becomes smaller than the thrust command initial value Tr0 indicated by the broken line 67 as illustrated in the lower diagram of FIG. 7. (Here, the control from time 69 to time 70 is referred to as "third control mode".)

Next, when the hydraulic pressure command initial value Pr0 (broken line 63) becomes equal to or less than the threshold Pdown66 at time 70 when the hydraulic pressure is falling, the hydraulic pressure command value Pr1 is set to 0 as illustrated in the solid line 64 in the central diagram of FIG. 7 as described in Steps S12 and S13. (That is, the operation of the hydraulic disk brakes 4R and 4L is stopped.) In accordance with this command value, the valves are fully opened to set the hydraulic pressure for driving the hydraulic disk brakes 4R and 4L by the front wheel side braking mechanism 4 to 0. The detection pressure Pr of the caliper pressure sensor 22R is also greatly reduced as indicated by the chain line 65 in the center diagram of FIG. 7.

After the time 71 when the hydraulic pressure drop of the hydraulic disk brake 4R indicated by the chain line 65 is large, and the detection pressure Pr (chain line 65) becomes smaller than the hydraulic pressure command initial value Pr0 (dotted line 63) which is the hydraulic pressure corresponding to the braking force originally intended to be generated by the hydraulic disk brake 4R of the front wheel, the front wheel compensation amount calculated by the front wheel compensation amount calculation unit 44 of Step S15 becomes a positive value. Therefore, the solid line 68 indicating the rear wheel thrust command value Tr1 calculated by the rear wheel operation correction unit 45 turns to increase and the braking force of the electric disk brake 5R increases, and the shortage of the braking force generated by the hydraulic disk brake 4R is supplemented. As these results of this processing, the actual vehicle braking force follows the solid line 61 of the required vehicle braking force Fc with a response delay of the electric disk brake as illustrated by a chain line 62 in the upper diagram of FIG. 7. (Here, the control from time 70 to time 72 is referred to as "fourth control mode".)

In the vehicle 1 including the brake control device 30 that performs the above-described processes at the time of pressure increase and pressure decrease, the operation of the front wheel side braking mechanism 4 is limited in a low pressure region where the pressure control accuracy of the front wheel side braking mechanism 4 is low. Accordingly, it is possible to correct the operation of the rear wheel side braking mechanism 5 having high thrust control accuracy according to the excess or deficiency with respect to the required vehicle braking force Fc. As a result, the change in the braking force acting on the vehicle 1 becomes smooth, so that the control accuracy of the brake device can be improved in response to minute braking force control requests. Therefore, a sudden change in the braking force and a response delay can be reduced, and the driver's discomfort can be reduced.

Further, in the processing of this embodiment, since there is a section in which the braking force generated by the rear wheels is greater than the braking force generated by the front wheels, the process of correcting the command value is performed so as to prevent the wheel lock after the correction of the braking forces generated by the front and rear wheels as illustrated in Step S17, so that the wheel lock prevention process can be prioritized.

Further, in this embodiment, the configuration in which the front wheel side braking mechanism 4 has a lower braking force control accuracy than the rear wheel side braking mechanism 5 has been described. For example, an electric mechanism is arranged on the front wheel side, and an electric hydraulic mechanism is arranged on the rear wheel side. If the braking force control accuracy of the front wheel side braking mechanism is higher than that of the rear wheel side braking mechanism, the operation of the rear wheel side braking mechanism is suppressed at low pressure contrary to the control method described above, and the front wheel side braking mechanism is operated to compensate for the excess or deficiency of the braking force. Thereby, the same effect as that of the above-described embodiment can be obtained.

In the above description, the case where the electric hydraulic mechanism is used for the front wheel side braking mechanism 4 and the electric mechanism is used for the rear wheel side braking mechanism 5 has been described. Even in a case where the electric mechanism is used for the front and rear wheels, the operation of the braking mechanism with the lower braking force control accuracy is suppressed when there is a difference in the braking force control accuracy of the braking mechanism of the front wheel. Therefore, the excess or deficiency of the braking force is compensated for by the mechanism with the higher braking force control accuracy. As a result, substantially the same effects as those of the embodiment described above can be obtained.

Also, the case where the detection values (detected pressures) of the caliper pressure sensors 22R and 22L are used in the front wheel compensation amount calculation unit 44 and the rear wheel operation correction unit 45 has been described, but the same effect can be obtained by using the pump pressure sensor 21 instead of the caliper pressure sensors 22R and 22L and the estimated value of the caliper pressure calculated from the operation of each electromagnetic valve.

Second Embodiment

Figure 8:
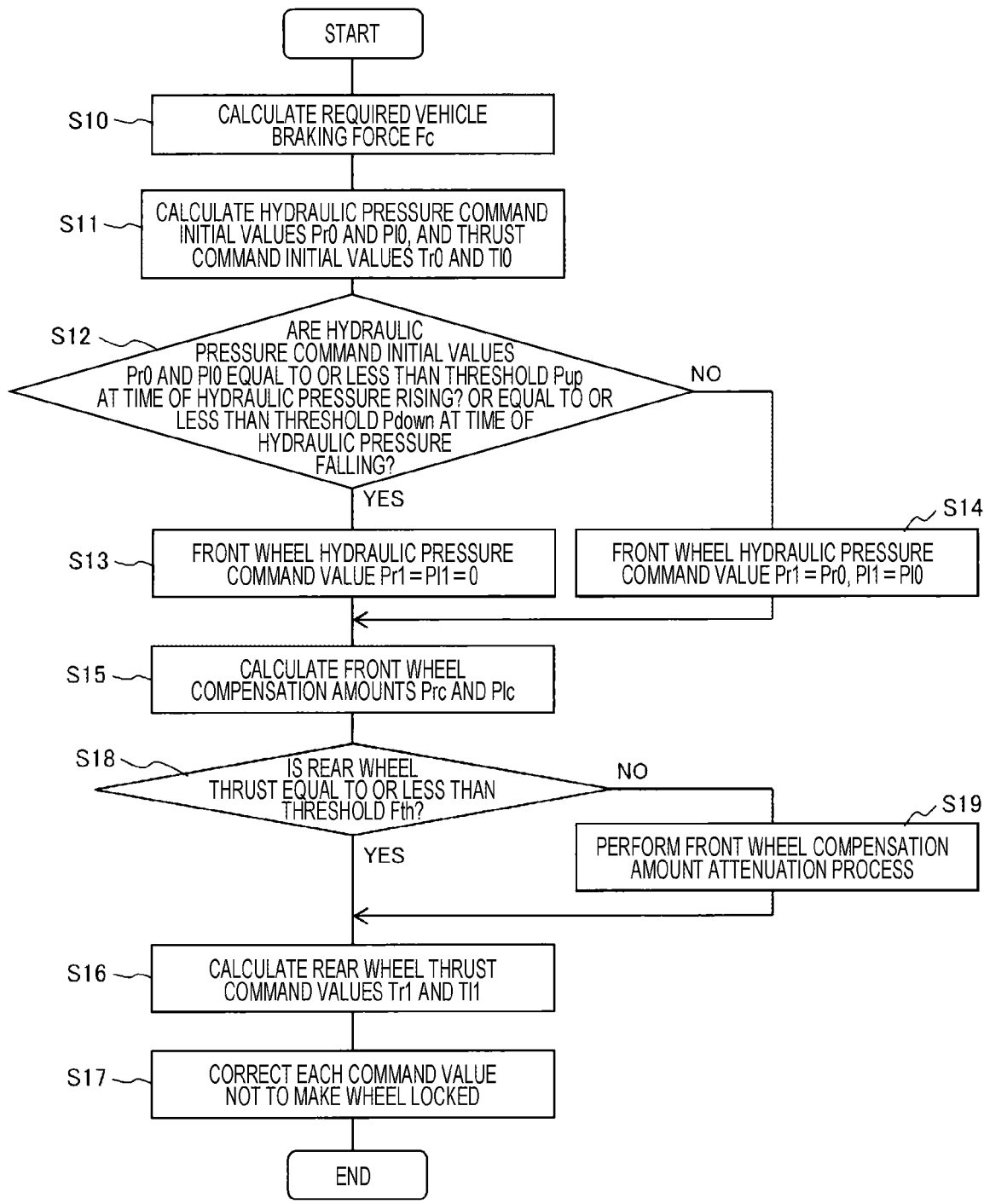
FIG. 8 is a flowchart illustrating a control method of the brake device according to one embodiment of the invention. (Second Embodiment)

With reference to FIG. 8, a control method of a vehicle brake system according to a second embodiment of the invention will be described. FIG. 8 is a flowchart illustrating control executed by the brake control device of this embodiment, and corresponds to a modification of the first embodiment (FIG. 5). Further, control steps having the same contents as the control steps in FIG. 5 are denoted by the same reference numerals, and description thereof will be omitted.

The control flow of this embodiment illustrated in FIG. 8 is different from that of the control flow illustrated in FIG. 5 in that Steps S18 and S19 are added between Steps S15 and S16 in FIG. 5. In this embodiment, Step S18 is executed after Step S15.

<<Step S18>>

Subsequent to Step S15, in Step S18, the values of the rear wheel thrust sensors 29R and 29L are compared with a threshold Fth. If the rear wheel thrust is equal to or less than the threshold Fth (YES), the process proceeds to Step S16, and if larger than the threshold Fth (NO), the process proceeds to Step S19.

<<Step S19>>

Subsequently, in Step S19, a front wheel compensation amount attenuation process is performed. For example, the front wheel compensation amount may be recalculated using the equations illustrated in Expressions (7) and (8).

[Math. 7]

$$Prc = f(Fr-Fth) \times Prc \qquad (7)$$

[Math. 8]

$$Plc = f(Fl-Fth) \times Plc \qquad (8)$$

Here, f is a function of the thrust and is set to 1 when the threshold is Fth, and the thrust may be set to be smaller when the rear wheel thrust becomes larger than Fth. By using such a function, when the rear wheel thrust becomes larger than the threshold Fth, the front wheel compensation amount is attenuated.

As in this embodiment (FIG. 8), by adding Steps S18 and S19 to the control flow of the first embodiment (FIG. 5), when a large thrust is generated on the rear wheel, the rear wheel operation correction is stopped. Therefore, when the front wheel hydraulic pressure is significantly insufficient, it is possible to prevent the rear wheel thrust from becoming excessive and prevent the rear wheel from locking.

Third Embodiment

Figure 9:
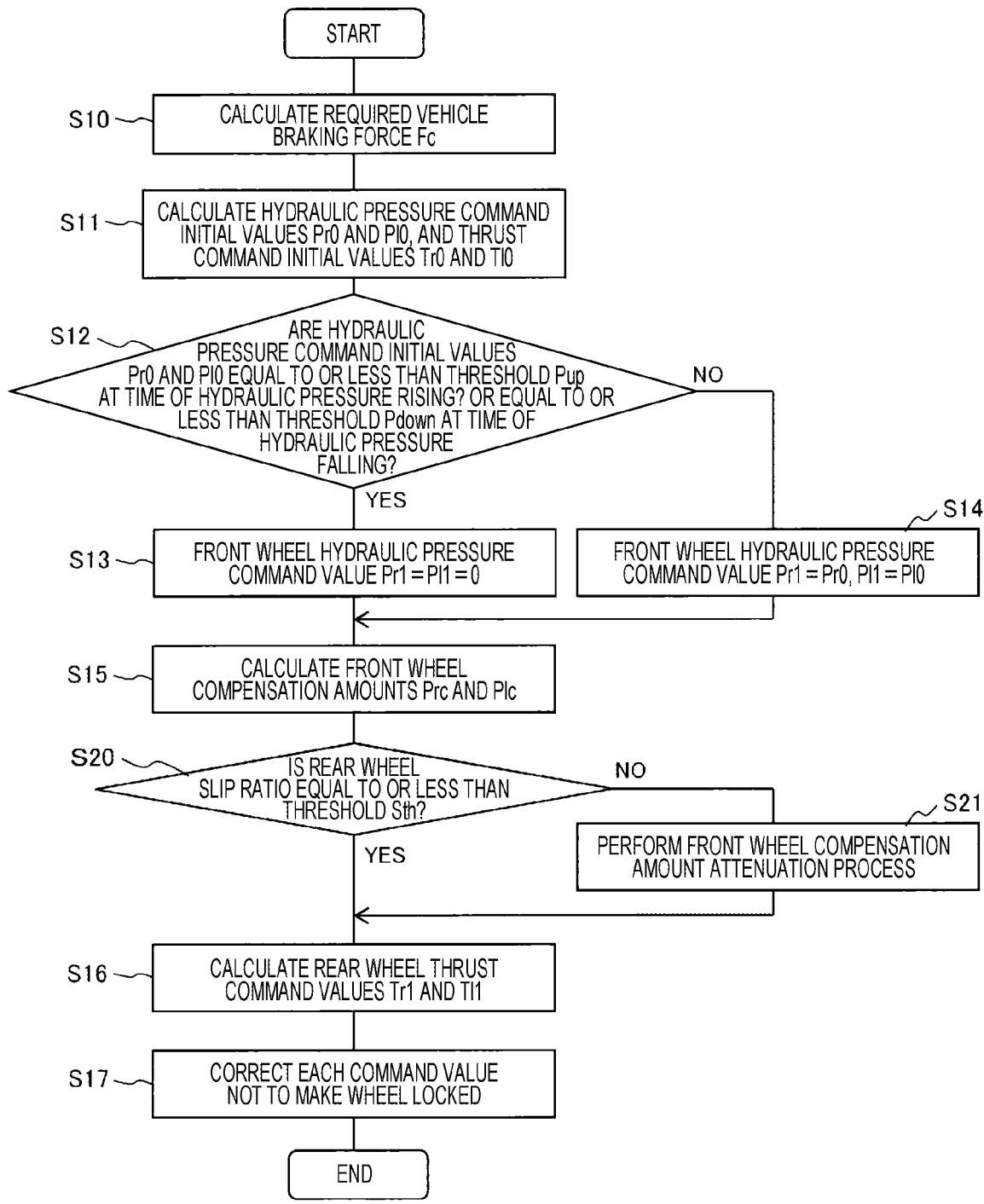
FIG. 9 is a flowchart illustrating a control method of the brake device according to one embodiment of the invention. (Third Embodiment)

With reference to FIG. 9, a control method of the vehicle brake system according to a third embodiment of the invention will be described. FIG. 9 is a flowchart illustrating control executed by the brake control device of this embodiment, and corresponds to a modification of the second embodiment (FIG. 8).

The control flow of this embodiment illustrated in FIG. 9 is different from the control flow of the second embodiment (FIG. 8) in that Steps S20 and S21 are added instead of Steps S18 and S19 of the control flow illustrated in FIG. 8.

<<Step S20>>

Subsequent to Step S15, in Step S20, a rear wheel slip rate is calculated from the value of the wheel rotation speed sensor 34, and the rear wheel slip rate is compared with a threshold Sth. If the rear wheel slip rate is equal to or less than the threshold Sth (YES), the process proceeds to Step S16, and if larger than the threshold Sth (NO), the process proceeds to Step S21.

<<Step S21>>

Subsequently, in Step S21, a front wheel compensation amount attenuation process is performed. For example, the front wheel compensation amount may be recalculated using the expressions illustrated in Expressions (9) and (10).

[Math. 9]

$$Prc = g(Sr-Sth) \times Prc \qquad (9)$$

[Math. 10]

$$Plc = g(Sr-Sth) \times Plc \qquad (10)$$

Here, g is a function of the slip rate and is set to 1 when the threshold is Sth, and the slip rate may be set to be smaller when the rear wheel slip rate is larger than Sth. By using such a function, when the rear wheel slip rate becomes larger than the threshold Sth, the front wheel compensation amount is attenuated.

As in this embodiment (FIG. 9), by adding Steps S20 and S21 instead of Steps S18 and S19 of the control flow of the second embodiment (FIG. 8), the control amount is attenuated before the control is released by the rear wheel lock determination. Therefore, the operation when the slip rate increases can be made smooth.

Fourth Embodiment

With reference to FIG. 10, a control method of a vehicle brake system according to a fourth embodiment of the invention will be described. FIG. 10 is a flowchart illustrating control executed by the brake control device of this embodiment, and corresponds to another modification of the first embodiment (FIG. 5).

The control flow of this embodiment illustrated in FIG. 10 differs from the control flow illustrated in the first embodiment (FIG. 5) in that Step S22 is used instead of Step S13 of the control flow illustrated in FIG. 5.

<<Step S22>>

In Step S22, since the front wheel operation correction unit 43 has determined that the pressure control accuracy of the front wheel side braking mechanism 4 is low, the hydraulic pressure command initial values Pr0 and Pl0 are corrected, and hydraulic pressure command values Pr1 and Pl1 for commanding the front wheel side braking mechanism 4 is newly calculated. The front wheel hydraulic pressure command values Pr1 and Pl1 at this time are obtained by Expressions (11) and (12).

[Math. 11]

$$Pr1 = KPr0 \qquad (11)$$

[Math. 12]

$$Pl0 = KPl0 \qquad (12)$$

Here, K is a value smaller than 1. As in this embodiment (FIG. 10), the front wheel hydraulic pressure command value is calculated using Step S22 instead of Step S13 of the control flow illustrated in the first embodiment (FIG. 5), so that the operation of the front wheel side braking mechanism 4 can be suppressed in the region where the front wheel control accuracy is low. Therefore, substantially the same effect as that of the first embodiment can be obtained.

Further, the invention is not limited to the above embodiments, but various modifications may be contained.

For example, the above-described embodiments of the invention have been described in detail to facilitate understanding, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 1 vehicle
2R, 2L (a pair of) front wheels
3R, 3L (a pair of) rear wheels
4 front wheel side braking mechanism
4R, 4L hydraulic disk brake
5 rear wheel side braking mechanism
5R, 5L electric disk brake
6 front wheel side electric hydraulic mechanism
7 front wheel side drive circuit
8 pump electric motor
9 reservoir tank
10 hydraulic pump
11 electromagnetic pressure regulating valve
12R, 12L electromagnetic inflow valve
13R, 13L electromagnetic outflow valve
14 electromagnetic shut-off valve
15 hydraulic circuit system
16 brake pedal
17 master cylinder
18 stroke simulator
19 electromagnetic stroke simulator valve
20 master cylinder pressure sensor
21 pump pressure sensor
22R, 22L caliper pressure sensor
23 control signal line
24 rear wheel side electric mechanism
25R, 25L brake electric motor
26 brake pad
27 rotation/linear motion conversion mechanism
28 rear wheel side drive circuit
29R, 29L thrust sensor
30 brake control device
33 upper-level control device
34 wheel rotation speed sensor
35 vehicle motion sensor
41 vehicle braking force calculation unit
42 each wheel command initial value calculation unit
43 front wheel operation correction unit
44 front wheel compensation amount calculation unit
45 rear wheel operation correction unit
46 front wheel lock prevention unit
47 rear wheel lock prevention unit

The invention claimed is:

1. A brake system, comprising:
a first brake device;
a second brake device that has a different control accuracy of the braking force from the first brake device; and
a brake control device that controls a braking force of the first brake device and a braking force of the second brake device according to a required braking force,
wherein the brake control device has
a first control mode in which the braking force of the first brake device is controlled to be smaller than the braking force of the second brake device, and
a second control mode in which the braking force of the first brake device is increased rather than the first control mode, and
wherein the second brake device is controlled so that a sum of the braking force of the first brake device and the braking force of the second brake device matches the required braking force.

2. The brake system according to claim 1, wherein
in the first control mode, the second brake device is operated earlier than the first brake device, and
the first brake device is operated in the second control mode.

3. The brake system according to claim 1, wherein
in the second control mode, the braking force of the first brake device is controlled to be increased, or an increasing amount of the braking force is controlled to be increased.

4. The brake system according to claim 1, wherein
in the second control mode, the braking force of the second brake device is decreased according to an increase in the braking force of the first brake device.

5. The brake system according to claim 1, wherein
the first brake device is a hydraulic brake device, and
the second brake device is an electric brake device.

6. The brake system according to claim 1, wherein
the first brake device is disposed on a front wheel of a vehicle, and
the second brake device is disposed on a rear wheel of the vehicle.

7. The brake system according to claim 1, wherein
the brake control device has a wheel lock prevention function, and
wheel lock prevention control is prioritized over the first control mode and the second control mode, or the third control mode and the fourth control mode.

8. The brake system according to claim 1, wherein
a boundary between the first control mode and the second control mode or a boundary between the third control mode and the fourth control mode is determined based on a command value for the first brake device.

9. A brake system, comprising:
a first brake device;
a second brake device that has a different control accuracy of the braking force from the first brake device; and
a brake control device that controls a braking force of the first brake device and a braking force of the second brake device according to a required braking force,
wherein the brake control device has
a third control mode in which the braking force is reduced in accordance with a braking force reduction command, and
a fourth control mode in which the braking force of the first brake device is reduced rather than the third control mode, and wherein the second brake device is controlled so that a sum of the braking force of the first brake device and the braking force of the second brake device matches the required braking force.

10. The brake system according to claim 9, wherein the first brake device is stopped in the fourth control mode.

11. The brake system according to claim 9, wherein in the fourth control mode, the first braking device is operated so that a reduction amount of the braking force by the first brake device is larger than a reduction amount of the braking force of the first brake device in the third control mode.

12. The brake system according to claim 9, wherein in the fourth control mode, the braking force by the first brake device is controlled to be smaller than the braking force by the second brake device.

13. A control method for a brake system which includes a hydraulic brake device disposed on a front wheel of a vehicle, and an electric brake device disposed on a rear wheel of the vehicle, the control method comprising:
   (a) calculating a required vehicle braking force of the vehicle;
   (b) calculating a hydraulic pressure command initial value of the hydraulic brake device and a thrust command initial value of the electric brake device based on the calculated required vehicle braking force;
   (c) performing a comparison between the hydraulic pressure command initial value and a predetermined threshold to determine a control accuracy of the hydraulic brake device;
   (d) when it is determined that the control accuracy of the hydraulic brake device is low, correcting the hydraulic pressure command initial value;
   (e) calculating a front wheel compensation amount based on the hydraulic pressure command initial value and a hydraulic pressure of the hydraulic brake device;
   (f) calculating a thrust command value based on the front wheel compensation amount, the thrust command initial value of the electric brake device, and a measured thrust; and
   (g) correcting the hydraulic pressure command value of the hydraulic brake device and the thrust command value of the electric brake device so as to prevent wheel lock, based on each wheel speed of the front wheel and the rear wheel.

14. The control method for the brake system according to claim 13, further comprising:
   between the step (e) and the step (f),
   (h) performing a comparison between a rear wheel thrust detected by a thrust sensor and a predetermined threshold, and, when determined that the detected rear wheel thrust is larger than the threshold, attenuating the front wheel compensation amount.

15. The control method for the brake system according to claim 13, further comprising:
   between the step (e) and the step (f),
   (i) calculating a rear wheel slip rate from a value detected by a wheel rotation speed sensor, comparing the calculated rear wheel slip rate with a predetermined threshold, and when determined that the calculated slip rate is larger than the threshold, attenuating the front wheel compensation amount.

* * * * *